June 26, 1962 — L. R. WHITTINGTON — 3,040,384
METHOD OF MAKING HOLLOW PLASTIC ARTICLES
Filed March 10, 1960 — 3 Sheets-Sheet 1

INVENTOR,
Lloyd R. Whittington
BY William Cleland
Attorney

June 26, 1962   L. R. WHITTINGTON   3,040,384
METHOD OF MAKING HOLLOW PLASTIC ARTICLES
Filed March 10, 1960   3 Sheets-Sheet 2
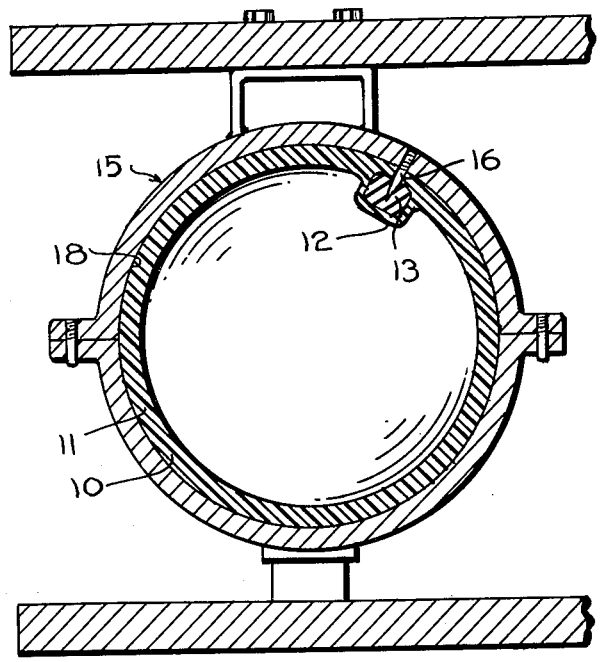
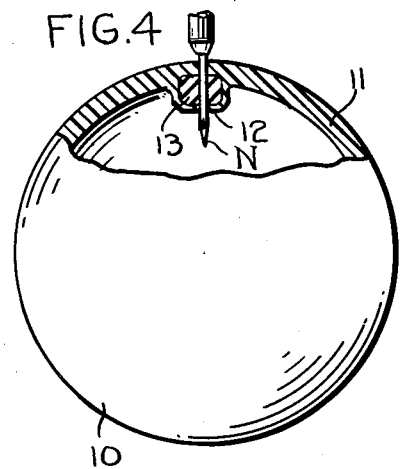
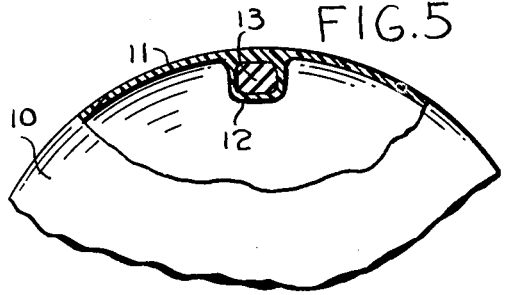
INVENTOR.
Lloyd R. Whittington
BY William Cleland
Attorney June 26, 1962  L. R. WHITTINGTON  3,040,384
METHOD OF MAKING HOLLOW PLASTIC ARTICLES
Filed March 10, 1960  3 Sheets-Sheet 3

INVENTOR.
Lloyd R. Whittington
BY William Cleland
Attorney

United States Patent Office 3,040,384
Patented June 26, 1962

3,040,384
METHOD OF MAKING HOLLOW PLASTIC
ARTICLES
Lloyd R. Whittington, Ashland, Ohio, assignor, by mesne assignments, to The Sun Rubber Company, Barberton, Ohio
Filed Mar. 10, 1960, Ser. No. 14,122
2 Claims. (Cl. 18—58.3)

This invention relates to hollow plastic articles, and in particular relates to a method of making hollow articles, such as toy and athletic playballs or the like, from mixtures of synthetic resins and plasticizers.

In the past, hollow articles, such as playballs, have been produced by placing a predetermined quantity of a suitable liquid mixture of a vinyl resin and a plasticizer therefor or vinyl plastisol mixture in a mold cavity, rotating the mold in the presence of heat to deposit the mixture as a gelled layer against the mold cavity surface, applying additional heat to the closed mold to raise the temperature of the same until the gelled layer fused, cooling the mold below fusion temperature of the fused layer, and removing the article from the mold.

The amount of predetermined plastisol mixture charged into the mold cavity has heretofore been regulated to produce an average deposit thickness substantially equal to that desired in the article as finished and ready for sale. It has been necessary to hold such wall thicknesses to a relatively low range, for example between 0.070 inch and 0.100 inch, in order for the process to be competitive with others employing cheaper materials, for example, rubber.

As is well known to those skilled in the art, in rotational casting of such thin-walled articles it is difficult to maintain uniformity of wall thickness. For example, in spherical playballs heretofore commercially produced, it was common to find one section of a ball wall varying from 25% to 50% in thickness from another section of the same ball. Naturally such playballs would rebound at an angle when bounced, and wobble when tossed or rolled on a smooth surface.

All playballs are inflated during or after forming to attain firmness. When a ball of non-uniform wall section is inflated even to a moderate degree, the areas of thinnest wall section will distend more, causing imperfect sphericity which worsens the erratic bounding and rolling properties. Furthermore, playballs inflated only at such moderate degrees of internal pressure rapidly lose their firmness and length of useful service life.

The aforecited difficulties are minimized by increasing the amount of the charge and hence the average thickness of deposit, but here the practitioner of prior art methods would have encountered a new set of problems. Vinyl is a very poor conductor of heat, the coefficient of thermal conductivity for a typical plasticized layer being .00035. Conductivities of aluminum and copper, the materials generally employed for molds, are respectively .514 and .908. Thus, a vinyl deposit against a mold wall can conduct heat only about 1/700 and 1/400 as fast as aluminum and copper, respectively, assuming equal thicknesses and temperature differentials. With increased deposit thickness accompanied with time and temperature conditions of cycle generally demanded for economical productivity, it would have become even more difficult to attain fusion of remote portions of the deposited vinyl layer without degrading or discoloring portions of the layer in contact with the mold cavity wall. Furthermore, molds suitably mounted for commercial use are not perfectly uniform in thickness or conductivity characteristics. Mounting brackets and registering flanges cause local variations in rate of heat application, as do deposits of charred material on external mold surfaces resulting from accidental spillage during charging.

One object of the present invention is to provide an improved rotational casting method of making hollow spherical playballs and like objects from synthetic resin mixtures, of more uniform wall thickness and better quality.

Another object of the invention is to provide a method of rotational casting of hollow articles in which tensile strength and other physical properties are substantially uniform and at optimum degrees in all sectional areas of the article.

Another object of the invention is to provide a method of rotational casting of hollow articles by which defects of degradation and surface discoloration are avoided.

Another object of the invention is to provide an improved rotational casting method of making a relatively thick-walled spherical preform or blank casting in a mold having substantial capacity for storing heat energy, of such perfection in uniformity of wall thickness, tensile strength and other physical properties, as to permit subsequent inflation of this preformed casting to a uniformly thin-walled ball of economical weight for its finished diameter, at higher internal pressures than heretofore practiced to assure longer useful life of the product.

These and other objects of the invention will be manifest from the following brief description and the accompanying drawings.

Of the accompanying drawings:

FIGURE 3 is a view corresponding to FIGURE 2, in which the vinyl ball has advanced to a fused state as indicated by the absence of stippling in the cross-hatched portions of the ball.

FIGURE 4 is a view of the fused ball, partly broken away and in section, after removal from the mold, and with an inflation needle in position for inflating the ball.

FIGURE 5 is a fragmentary view, similar to FIGURE 4, in part, in which the ball has been inflated to greatly increased diameter.

Figure 6:
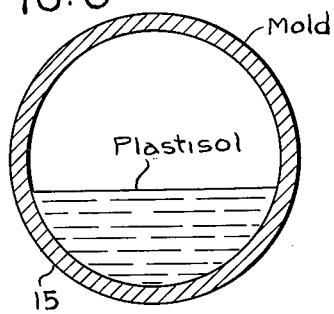
FIGURES 6, 7 and 8 are a series of semi-diagrammatic views, all on the same scale for comparative purposes, respectively showing the plastisol charged mold as in FIGURE 1, the fused thick-walled ball as in FIGURE 4, and the ball of FIGURE 4 inflated as shown in FIGURE 5.
Figure 8:
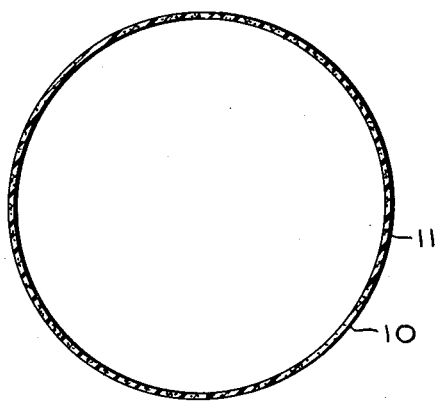
Figure 7:
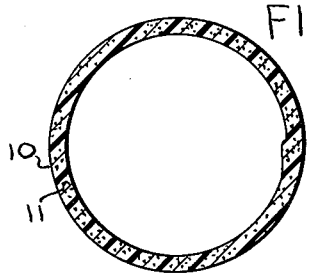
Figure 9:
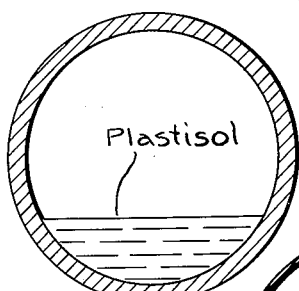
Figure 10:
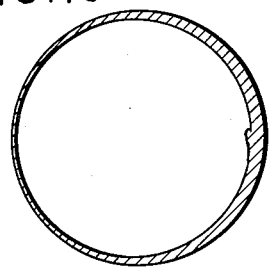
Figure 11:
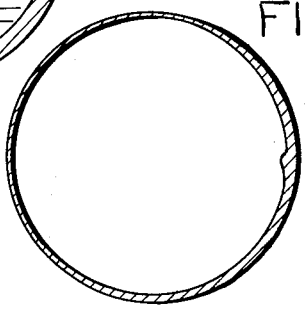

FIGURES 9, 10, and 11 are similarly comparative, semi-diagrammatic views, on the same scale as FIGURES 6, 7 and 8, respectively showing the same mold charged with a smaller amount of plastisol for practicing a generally accepted prior art vinyl casting method, a thin-walled ball formed thereby, and the same thin-walled ball after inflation.

Figure 12:
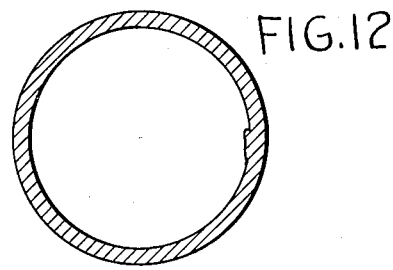
Figure 13:
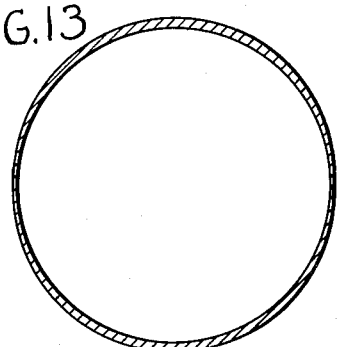

FIGURES 12 and 13 are comparative semi-diagrammatic views, each on the same scale as FIGURES 6 to 11, in which FIGURE 12 shows the results attained by said prior art method when the mold is charged with the same amount of plastisol as shown in FIGURE 6, for producing a thick-walled ball as shown in FIGURE 12, and by which FIGURE 13 shows the undesirable results attained by inflation of thick-walled ball made by said prior art method.

The product of the method of the present invention is a hollow article of a mixture of synthetic resin and a plasticizer, such as the uninflated playball 10 best illustrated in FIGURE 4, capable of being inflated to increased diameter without distortion in shape, as best illustrated in FIGURE 5. Integrally formed in the wall 11 of the ball may be a housing 12 for a self-sealing insert 13, used for inflating the ball to full size (see FIGURE 5).

In order to assure complete understanding and avoid undue experimentation by the worker desirous of following the teachings of the description to follow, and in view of the past misunderstandings of terminology employed at various times and geographical locations in the plastisol industry, it is necessary to define certain terms used herein.

The term "gel" denotes the physical state of a plastisol mixture, having been in flowable fluid form at the time of mixing or blending, but subsequently altered to a relatively stiff non-fluid mass, which mass has not yet acquired its optimum physical properties.

The term "fusion" denotes the substantially-instantaneous change of state that occurs when a gelled deposit of plastisol is increased in temperature to a critical point at which the mass becomes semi-molten and homogeneous, and possessed of (after cooling) its optimum physical characteristics. For reasons to become manifest in the following description, it is essential that the critical nature of the fusion point of vinyl plastisol be fully understood. To this end, the well-known "clear point test" may be employed as the most sensitive and accurate means for determining the exact fusion temperature for any vinyl formulation under consideration.

Figure 1:
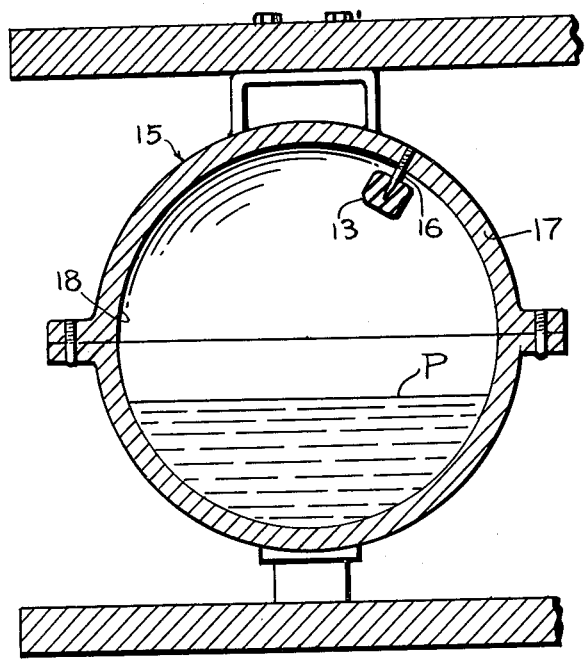
FIGURE 1 is a fragmentary cross-section of a cavity mold, in closed condition, for an initial rotary-casting step in the presence of heat, for forming a vinyl ball.

Referring to FIGURE 1, in practicing the method of the invention for making vinyl playballs, there is first provided a sectional mold 15 having a pin 16 secured to a spherical wall 17 thereof to project radially inwardly of the article-forming cavity surface 18. For convenience, the method will be described in connection with a single cavity mold having a substantial capacity for storing heat energy, although it is understood that multiple cavity molds, as for example, of the type shown in prior Delacoste et al. U.S. Patent No. 2,624,072, are generally used. Also, for convenience, the method will be described in connection with a self-sealing inflation closure, although it is understood that any valving or sealing means may be employed.

While the mold is open an operator positions an insert 13 on the pin 16. The insert may be of a self-sealing plastic material having a bonding affinity for vinyl, such as an acrylic ester copolymer. The outer end of positioned insert 13 is spaced a sufficient distance from the cavity surface 18 to permit the subsequently-charged plastisol to flow around the pin 16 and to unite with a substantial portion of the surface of the insert 13.

A measured charge P of a vinyl plastisol, such as a mixture, dispersion, paste or blend of polyvinyl chloride and a plasticizer, is now placed in the open mold, such charge being of sufficient amount or volume to form an article of uniform wall thickness, ranging from .125 inch to .300 inch. This amount of material is far in excess of the economical limit for a ball of substantially the same diameter as that of the article-forming mold cavity surface.

Figure 2:
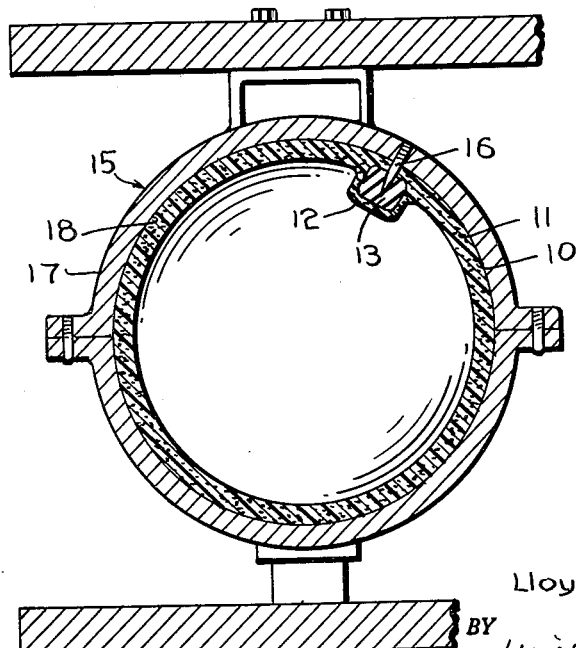
FIGURE 2 is a view corresponding to FIGURE 1, illustrating the vinyl ball formed in the mold by said rotary-casting step, but in a gelled state, as indicated by stippling in the cross-hatched portions of the ball.

The operator now closes the mold and causes the same to be rotated about a plurality of axes (or through a plurality of angularly disposed planes) in the presence of external heat within a heating chamber (not shown), for a predetermined length of time sufficient to deposit the charge against the mold cavity surface 18, the time and degree of heat within the heating chamber, however, being insufficient to raise the temperature of the layer to the fusion point of the mixture. For best results in the foregoing step the temperature applied to the mold may be 20° F. to 40° F. lower than normally used heretofore in commercial manufacture of balls from vinyl plastisol. Accordingly, at this point a thick-walled ball 10 will have been fully formed as a layer of gelled plastisol, various areas of which, however, are heated to various stages of gellation due to the variables previously discussed and to the poor thermal conductivity of the thick-walled deposit. The gelled deposit also unites around the pin 16, and around the housing insert 13 as shown in FIGURE 2. For the purpose of clarity the cross-hatching of the ball 10 in FIGURE 2 includes stippling to represent that the deposit is in a gelled or unfused state, and it is in this condition that the mold is now removed from the heating chamber and from the presence of external heat applied to the mold structure.

At this point temperature gradients exist between the outside and inside surfaces of the mold, and there also exists a series of more pronounced temperature gradients between various inner surface areas of the deposit and opposite areas in contact with the inner mold surface.

The severity of thermal gradients may now be diminished by the application of a cooling air stream to the closed mold for a predetermined period of time, or holding the mold in an equalizing atmosphere of much lower temperature than that required for fusion of the plastisol. Now the remaining lesser gradients tend to equalize among themselves, finally imparting to all areas of the deposited layer a temperature sufficient to attain fusion of the deposited layer without degradation or discoloration.

Following the aforesaid equalizing period, determined to require from ½ minute to 1½ minutes, the mold may be quickly cooled to room or convenient handling temperature by quenching in a spray or submersion in a bath of cold water. The mold is then opened and the fused article removed.

The novel degree of uniformity of deposit thickness and physical properties imparted by the method of this invention enables the thick-walled casting to be inflated to almost any desired extent without loss of good sphericity, as shown in FIGURES 5 and 8.

As a convenient means of quality control testing from time to time, the following procedure has been followed, in the course of normal production, a mold or single cavity thereof was charged with the established amount of plastisol, of the established formulation but with color pigments omitted. Subject mold was then subjected to the normal sequence of operations but at the instant of removal from the heating chamber, the tempering period was omitted by immediately quenching the mold in water. Upon opening the mold, the deposit was found to be cloudy in most areas, indicating that such areas were not fused. The process was repeated in a subsequent mold, but the normal tempering and cooling operations were allowed to proceed, whereby the unpigmented ball was found to be of uniform clarity, with no cloudy or translucent areas.

FIGURES 6 to 13 are a series of diagrammatic views, all on the same scale, diagrammatically illustrating differences in results attained by the improved method of the present invention (FIGURES 6, 7 and 8) and two methods following the prior art (FIGURES 9 to 11 and FIGURES 6, 12 and 13).

FIGURES 6 to 8 illustrate conditions prevailing in the method of the present invention, described above in connection with FIGURES 1 to 5, and by which the finished, inflated ball (see FIGURES 5 and 8) has uniformity of fusion and tensile strength, freedom from degraded and discolored areas, and a uniformity of wall-thickness when fully inflated which is best understood by comparison of FIGURES 7 and 8.

FIGURES 9, 10 and 11, illustrate conditions generally prevailing in prior methods of making thin-walled balls, that is, by rotational casting of a relatively smaller amount of vinyl plastisol (see FIGURE 9). FIGURE 10 shows the average thickness of the fused layer deposited in the mold, with typical, generally experienced irregularities, and FIGURE 11 represents the inferior sphericity and balance of the finished ball of FIGURE 10 when inflated to even a slight degree, due to said irregularities.

FIGURE 12 illustrates the results attained by prior art methods when attempts were made to form a thick-walled ball, using a relatively large charge of vinyl plastisol in the mold, as shown in FIGURE 6. The inferior results generally attained included unfused areas, represented by means of stippling, or degraded or discolored areas, represented by solid black lines (see FIGURE 12). Such types of inferior results may or may not coexist. FIGURE 13 illustrates the defective sphericity and balance of the finished ball of FIGURE 12 when moderately inflated, due to the variations in tensile strength caused by presence of said unfused areas.

The commercial advantages of this new method can readily be seen. In use of the process of the invention, on a commercial scale, the average amount of plastisol per finished unit was found to have dropped from 40% to 50% as compared with prior methods, the scrap dropped from over 5% to less than 1% of total production, and the quality of the products increased to a degree heretofore unknown in the playball industry.

Although the process has been described in connection with the manufacture of hollow playballs, it also may be used for making many other hollow articles from synthetic resin pastes where the wall structure is relatively heavy.

Modifications of the invention may be resorted to without departing from the spirit thereof or the scope of the appended claims.

What is claimed is:
1. The process of making relatively thick-walled hollow articles from a liquid mixture of a vinyl resin and a plasticizer therefor, in which a measured charge of said mixture is deposited in a hollow sectional mold, said mold having substantial capacity for storing heat energy and article forming cavity surface portions, and said mold is closed with said deposited charge therein, and said closed mold is rotated in a multiplicity of planes to distribute the charge as a layer over the cavity surface portions, comprising the steps of, exposing said rotating mold to a source of heat energy for a period of time sufficient to gel said layer but insufficient to fuse the gelled layer, withdrawing said mold from further exposure to said source of heat energy to diminish the temperature gradient between the mold and the inner surface of the gelled layer thereby equalizing the temperature gradient within the layer, whereby the resultant transfer of heat energy from the mold to the layer will elevate the temperature within the layer sufficiently to fuse the same, and cooling the mold and opening the same for removal of the fused article therefrom.

2. The process of making a hollow article having uniform wall thickness ranging from .125 inch to .300 inch from a liquid mixture of a vinyl resin and a plasticizer therefor, in which a measured charge of said mixture is deposited in a hollow sectional mold, said mold having substantial capacity for storing heat energy and article forming cavity surface portions, and said mold is closed with said deposited charge therein, and said closed mold is rotated in a multiplicity of planes to distribute the charge as a uniform layer over the cavity surface portions, comprising the steps of, exposing said rotating mold to a source of heat energy for a period of time sufficient to gel said layer but insufficient to fuse the gelled layer, withdrawing said mold from further exposure to said source of heat energy and subjecting said withdrawn mold to a cooler atmosphere, holding said mold in said cooler atmosphere for an additional period of time sufficient to diminish the temperature gradient between the mold and the inner surface of the gelled layer thereby equalizing the temperature gradient within the layer, whereby the resultant transfer of heat energy from the mold to the layer during said additional period of time will elevate the temperature within the layer sufficiently to fuse the same, further cooling the mold, and removing the fused hollow article from the mold.

References Cited in the file of this patent
UNITED STATES PATENTS

| | | |
|---|---|---|
| 1,373,121 | Emery | Mar. 29, 1921 |
| 2,935,320 | Chupa | May 3, 1960 |

FOREIGN PATENTS

| | | |
|---|---|---|
| 591,611 | Great Britain | Aug. 22, 1947 |